United States Patent [19]
Connor

[11] Patent Number: 6,024,456
[45] Date of Patent: Feb. 15, 2000

[54] NON-HAZARDOUS SIDE REAR VIEW MIRROR

[76] Inventor: Peter Connor, 65 Pleasant St., P.O. Box 506, Sagamore, Mass. 02561

[21] Appl. No.: 09/224,317

[22] Filed: Dec. 31, 1998

[51] Int. Cl.$^7$ .............................. G02B 5/08; G02B 7/182
[52] U.S. Cl. .......................... 359/606; 359/605; 359/872
[58] Field of Search ................................... 359/601–608, 359/871–880

[56] References Cited

U.S. PATENT DOCUMENTS

| | | | |
|---|---|---|---|
| 1,909,526 | 5/1933 | Falge et al. | 359/606 |
| 4,281,898 | 8/1981 | Ochiai et al. | 359/606 |
| 4,371,235 | 2/1983 | Locke, Sr. | 359/605 |

FOREIGN PATENT DOCUMENTS

| | | | |
|---|---|---|---|
| 476507 | 8/1951 | Canada | 359/605 |
| 880266 | 10/1961 | United Kingdom | 359/605 |

*Primary Examiner*—Thong Nguyen

[57] ABSTRACT

A bright light reducing side rear view mirror system is provided including a frame attached to a side of an exterior of a vehicle. Also included is a mirror assembly having a mirror and a glass plate mounted to the frame A surface of the glass plate is angled with respect to the mirror for reducing an intensity of light being reflected towards a driver within the vehicle.

6 Claims, 2 Drawing Sheets

NON-HAZARDOUS SIDE REAR VIEW MIRROR

BACKGROUND OF THE INVENTION

1. Field of the Invention

The present invention relates to rear view mirrors and more particularly pertains to a new non-hazardous side rear view mirror for redirecting bright lights reflected toward a driver via a side rear view mirror.

2. Description of the Prior Art

The use of rear view mirrors is known in the prior art. More specifically, rear view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 5,022,701; U.S. Pat. No. 4,693,558; U.S. Pat. Des. 292,689; U.S. Pat. No. 5,098,912; U.S. Pat. No. 4,865,421; and U.S. Pat. No. 4,266,856.

In these respects, the non-hazardous side rear view mirror according to the present invention substantially departs from the conventional concepts and designs of the prior art, and in so doing provides an apparatus primarily developed for the purpose of redirecting bright lights reflected toward a driver via a side rear view mirror.

SUMMARY OF THE INVENTION

In view of the foregoing disadvantages inherent in the known types of rear view mirrors now present in the prior art, the present invention provides a new non-hazardous side rear view mirror construction wherein the same can be utilized for redirecting bright lights reflected toward a driver via a side rear view mirror.

The general purpose of the present invention, which will be described subsequently in greater detail, is to provide a new non-hazardous side rear view mirror apparatus and method which has many of the advantages of the rear view mirrors mentioned heretofore and many novel features that result in a new non-hazardous side rear view mirror which is not anticipated, rendered obvious, suggested, or even implied by any of the prior art rear view mirrors, either alone or in any combination thereof.

To attain this, the present invention generally comprises a frame with a rear face attached to a side of an exterior of a vehicle. A peripheral side wall is coupled to a periphery of the rear face and extends forwardly therefrom. The peripheral side wall includes an arcuate top face and an arcuate bottom face with a depth about twice that of the top face. A pair of end faces each have a generally triangular configuration. The peripheral side wall further includes an inwardly extending lip for defining an interior space and an open front. Next provided is a moving mirror assembly including a back plate with a planar rectangular configuration. The back plate has an elongated top edge, an elongated bottom edge, and a pair of short side edges. The back plate of the mirror assembly further includes a universal joint integrally coupled to a central extent of the back plate and extending rearwardly therefrom. Such universal joint is adapted for pivoting about a horizontal and a vertical axis. A mirror is shown to be mounted to the back plate in coplanar relationship therewith. Associated therewith is a glass plate having a top edge coupled to a top edge of the back plate of the mirror assembly in abutment with the mirror. A bottom edge of the mirror assembly is spaced from the back plate and the mirror via an elongated spacer. By this structure, the intensity or brightness of light being reflected into the vehicle towards a driver is reduced.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new non-hazardous side rear view mirror apparatus and method which has many of the advantages of the rear view mirrors mentioned heretofore and many novel features that result in a new non-hazardous side rear view mirror which is not anticipated, rendered obvious, suggested, or even implied by any of the prior art v, either alone or in any combination thereof.

It is another object of the present invention to provide a new non-hazardous side rear view mirror which may be easily and efficiently manufactured and marketed.

It is a further object of the present invention to provide a new non-hazardous side rear view mirror which is of a durable and reliable construction.

An even further object of the present invention is to provide a new non-hazardous side rear view mirror which is susceptible of a low cost of manufacture with regard to both materials and labor, and which accordingly is then susceptible of low prices of sale to the consuming public, thereby making such non-hazardous side rear view mirror economically available to the buying public.

Still yet another object of the present invention is to provide a new non-hazardous side rear view mirror which provides in the apparatuses and methods of the prior art some of the advantages thereof, while simultaneously overcoming some of the disadvantages normally associated therewith.

Still another object of the present invention is to provide a new non-hazardous side rear view mirror for redirecting bright lights reflected toward a driver via a side rear view mirror.

Even still another object of the present invention is to provide a new non-hazardous side rear view mirror that includes a frame attached to a side of an exterior of a vehicle. Also included is a mirror assembly having a mirror and a glass plate mounted to the frame A surface of the glass plate is angled with respect to the mirror for reducing an intensity of light being reflected towards a driver within the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
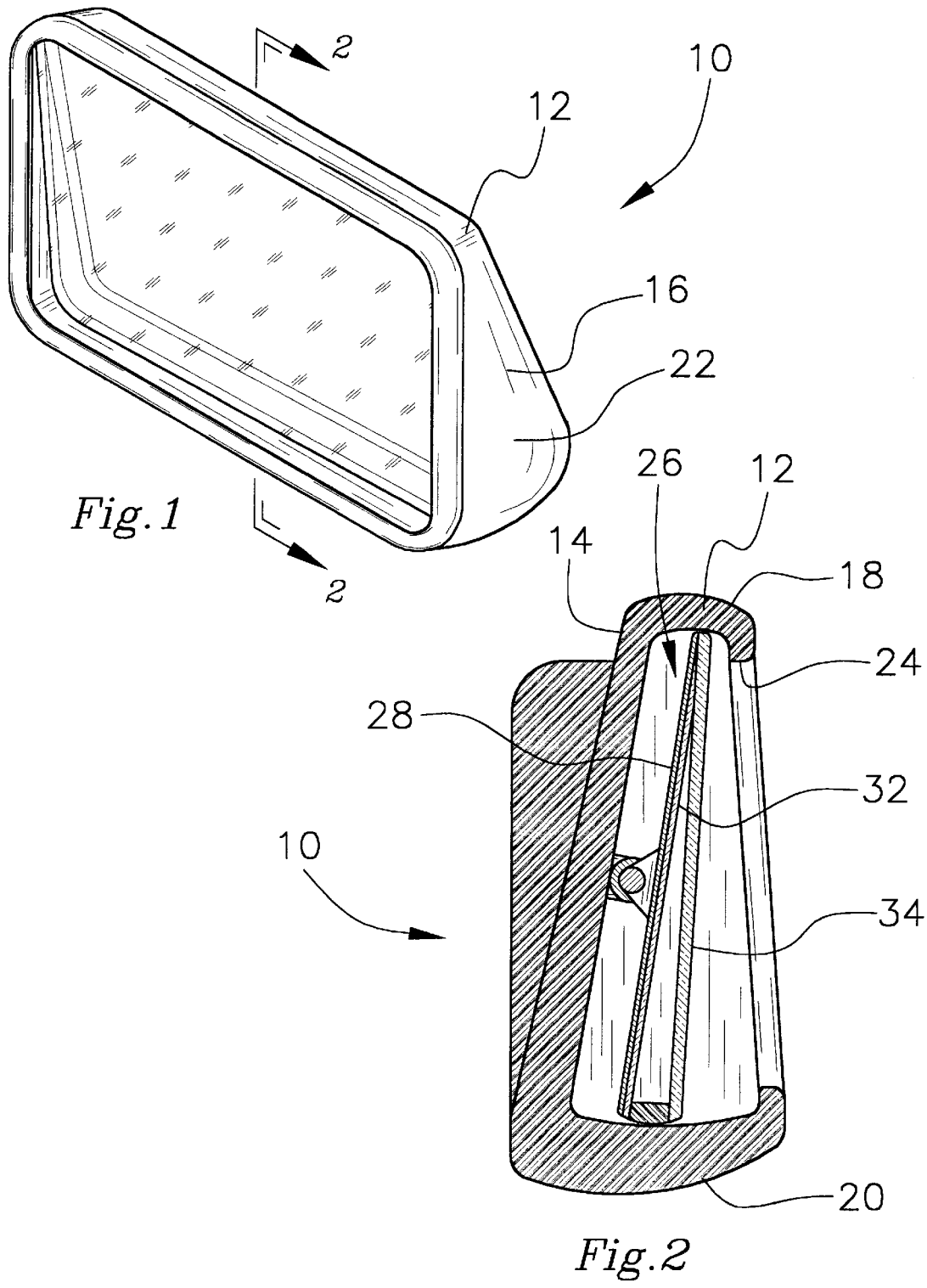
FIG. 1 is a perspective view of a new non-hazardous side rear view mirror according to the present invention.
FIG. 2 side cross-sectional view of the present invention taken along line 2—2 shown in FIG. 1.
Figure 3:
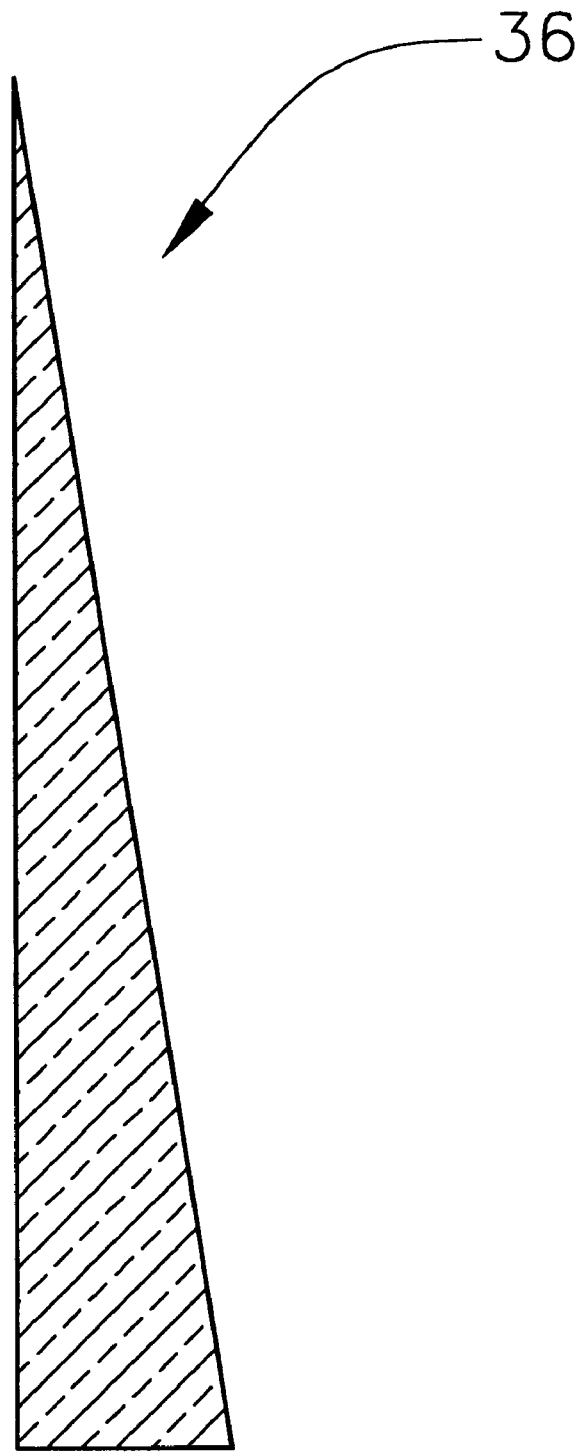
FIG. 3 an alternate embodiment of the glass plate of the present invention.

With reference now to the drawings, and in particular to FIGS. 1 through 3 thereof, a new non-hazardous side rear view mirror embodying the principles and concepts of the present invention and generally designated by the reference numeral 10 will be described.

The present invention, designated as numeral 10, includes a frame 12 with a rear face 14 attached to a side of an exterior of a vehicle. A peripheral side wall 16 is coupled to a periphery of the rear face and extends forwardly therefrom. The peripheral side wall includes an arcuate top face 18 and an arcuate bottom face 20 with a depth about twice that of the top face. As shown in FIG. 2, the top face and the bottom face have an inverted and upright U-shaped cross-section along a length thereof, respectively. A pair of end faces 22 each have a generally triangular configuration, as shown in FIG. 1. The peripheral side wall further includes an inwardly extending lip 24 for defining an interior space and an open front.

Next provided is a moving mirror assembly 26 including a back plate 28 with a planar rectangular configuration. As shown in FIGS. 1 & 2, the back plate has an elongated top edge, an elongated bottom edge, and a pair of short side edges. The back plate of the mirror assembly further includes a universal joint integrally coupled to a central extent of the back plate and extending rearwardly therefrom. Such universal joint is adapted for pivoting about a horizontal and a vertical axis. It should be noted that sufficient space is provided between the periphery of the back plate and an inner surface of the frame for allowing universal pivoting.

With reference still to FIGS. 1 & 2, a mirror 32 or reflective surface is shown to be mounted to the back plate in coplanar relationship therewith. Associated therewith is a planar rectangular glass plate 34 having a top edge coupled to a top edge of the back plate of the mirror assembly in abutment with the mirror. A bottom edge of the glass plate is spaced from the back plate and the mirror via an elongated spacer which is adhesively fixed between bottom edges of the mirror and glass plate. In various embodiments, the spacer affords spacing between ¼–¾ of an inch depending on the size of the mirror assembly. In the preferred embodiment, the glass piece is 1/16th of an inch thick while the gap is 3/16th of an inch. It should be noted that the width of the spacer may be varied as a function of the size of the mirror. In the alternative, the bottom edge of the glass plate may be mounted to the mirror while the top edge is spaced therefrom.

By this structure, the intensity or brightness of light being reflected into the vehicle towards a driver is reduced. In use, the light reducing effect of the glass plate may be selectively disabled and enabled by pivoting the mirror assembly about the horizontal axis.

In an alternate embodiment, the glass plate 36 may be wedge shaped with a first inner surface adhesively or otherwise attached to the mirror such that a second outer surface of the glass plate is angled with respect to the mirror in the manner set forth hereinabove. Further, the glass plate may be tinted or completely transparent.

It should be noted that the frame may take the form of any type of side rear view mirror structure. Further, the mirror assembly may be fixed in relation to the frame such that the frame and the mirror move coincidentally. In various alternate embodiments, the mirror assembly may be moved either manually or via conventional mechanical means. In addition, the frame and mirror assembly may take on any shape for various vehicles such as motorcycles, cars, recreation vehicles, commercial vehicles or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bright light glare reducing side rear view mirror system for attaching to a side of an exterior of a vehicle, the mirror system comprising:

a frame with a rear face attached to the side of the exterior of the vehicle and a peripheral side wall coupled to a periphery of the rear face and extending forwardly therefrom, the peripheral side wall including an arcuate top face, an arcuate bottom face with a depth about twice that of the top face, and a pair of end faces each having a generally triangular configuration, the peripheral side wall further including an inwardly extending lip for defining an interior space and an open front; and a moving mirror assembly including a back plate with a planar rectangular configuration having an elongated top edge, an elongated bottom edge, and a pair of short side edges, the mirror assembly further including a universal pivoting joint integrally coupled to a central extent of the back plate and extending rearwardly therefrom for pivoting about a horizontal axis and a vertical axis, the universal joint being coupled to a central extent of the rear face, a mirror mounted to the back plate in coplanar relationship therewith, and a glass plate having a top edge coupled to a top edge of the back plate of the mirror assembly in abutment with the mirror and a bottom edge spaced from the back plate and the mirror via an elongated spacer.

2. A bright light glare reducing side rear view mirror system for attaching to a side of an exterior of a vehicle, the mirror system comprising:

a frame attached to the side of the exterior of the vehicle, the frame having a rear face and a peripheral side wall coupled to a periphery of the rear face and extending forwardly therefrom, the peripheral side wall further including an inwardly extending lip for defining an interior space; and a mirror assembly including a mirror and a glass plate being pivotally mounted to the rear face of the frame, the glass plate being mounted to the mirror such that a surface of the glass plate is angled with respect to the mirror for reducing an intensity of light being reflected towards a driver within the vehicle.

3. A bright light reducing side rear view mirror system as set forth in claim 2 wherein a distance between the surface of the glass and the mirror is different at a top edge of the mirror with respect to a bottom edge of the mirror.

4. A bright light reducing side rear view mirror system as set forth in claim 2 wherein the mirror has a planar configuration and abuts the glass plate along a top edge and is spaced therefrom along a bottom edge via a spacer.

5. A bright light reducing side rear view mirror system as set forth in claim 2 wherein the glass plate includes a wedge with a first surface abutting the mirror and a second surface angled with respect to the mirror.

6. A bright light glare reducing mirror system comprising:

a frame having a rear face and a peripheral side wall coupled to a periphery of the rear face and extending forwardly therefrom, the peripheral side wall further including an inwardly extending lip for defining an interior space;

a mirror, the mirror being pivotally coupled to the rear face of the frame; and a glass plate mounted in front of the mirror such that a surface of the glass plate is angled with respect to the mirror for reducing an intensity of light being reflected from the mirror.

* * * * *